Oct. 10, 1950 I. L. STEPHAN ET AL 2,524,939

INTEGRAL SOCKET AND PRINTED CIRCUIT PANEL

Filed Sept. 9, 1948

INVENTORS
INGO L. STEPHAN
DUNDRED D. EVERS
BY
Brown, Denk & Synnestvedt
AGENTS

Patented Oct. 10, 1950 2,524,939

UNITED STATES PATENT OFFICE 2,524,939

INTEGRAL SOCKET AND PRINTED CIRCUIT PANEL

Ingo L. Stephan, Edgewater Park, and Dundred D. Evers, Philadelphia, Pa., assignors to Philco Corporation, Philadelphia, Pa., a corporation of Pennsylvania Application September 9, 1948, Serial No. 48,476

6 Claims. (Cl. 173—328)

The invention hereinafter described and claimed relates to electrical apparatus and, while of broader applicability, has particular reference to socket devices for supporting tubes, and for releasably establishing connection of the same with electrical circuits such, for example, as the circuits of radio receiving apparatus.

The invention has especial utility in radio apparatus utilizing a system of conductors of the so-called "printed" circuit type. By the use of such circuits—in which the various components of the apparatus are interconnected by conductive strips affixed directly to a mounting panel, in accordance with a predetermined circuit diagram—it is possible to make the apparatus considerably more compact and considerably to simplify the construction thereof, particularly by obviating the necessity of positioning and attaching connecting wires, terminals, and the like.

It is a primary object of the present invention to provide an arrangement adapted to support and connect—in apparatus of the aforesaid type—electrical devices such, for example as radio tubes, without the necessity of utilizing separately fabricated tube sockets, making soldered connections, and the like.

It is a feature of the invention that provision is made for supporting tubes in the simplest possible manner, and yet insuring good electrical connection between said tubes and associated printed circuits.

More particularly, the invention has as an object, the provision of support or socket structure which, essentially, is an integral part of the mounting panel and is adapted to receive the tube pins and to position the tube in such manner as to prevent inadvertent displacement thereof.

To the foregoing general ends, and in accordance with a preferred embodiment of our invention, the sub-base or mounting panel is apertured to provide slots the side walls of which engage pins or prongs extending from the tube, or other device to be mounted, and resiliently bear thereagainst. To facilitate insertion of the pins, and to increase the resilient pressure exerted against said pins, it is preferred that the apparatus further include an intermediate support member having portions cooperable with the aforesaid slots, whereby to position the support member and effect the aforesaid increase in resilient pressure.

The manner in which the foregoing, and other objects, constructional features and advantages, may best be attained, will be clearly understood from a consideration of the following detailed description, considered in conjunction with the accompanying drawing, in which.

Figure 1:
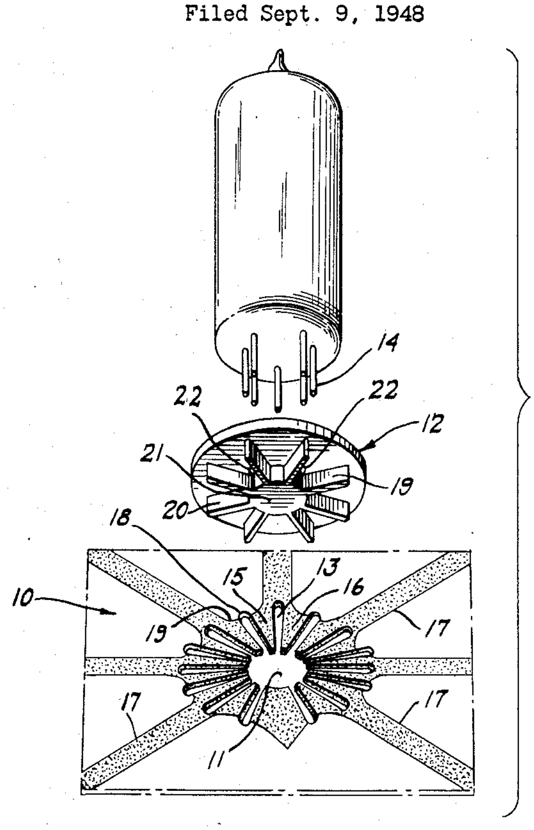
Figure 1 is an exploded view, in perspective, illustrating the component parts of a preferred embodiment of the invention.

Now making more particular reference to the drawing, there is shown fragmentarily, and designated generally by the reference numeral 10, a sub-base or mounting panel which may be of "Bakelite" or other suitable non-conductive material. As appears to best advantage in the perspective showings of Figure 1, the mounting panel is provided with an aperture 11, which cooperates with an intermediate support member 12 in a manner and for the purposes fully set forth hereinafter. Surrounding said aperture 11, and extending radially therefrom are a plurality of elongated apertures, or slots, 13 within which may be received pins 14 extending from the lower portion of the radio tube illustrated.

The slots and the aperture 11, disposed centrally thereof, may readily be formed in a single punching operation. There results a plurality of pairs of fingers (the fingers of an exemplary pair being designated by the reference characters 15 and 16) and as will be fully understood from consideration of Figure 3, the pins 14 of the tube are inserted between the two adjacent fingers of such a pair when the apparatus is in use. The fingers have an appreciable degree of inherent resilience and, since the slots are preferably of a width slightly less than the diameter of the tube pins, a snug resilient fit is insured. The length of the slots should be so chosen as to give the fingers the desired degree of resilience. Thus, the pins inserted between the fingers are held under considerable contact pressure.

Conductive material is disposed upon the non-conductive mounting panel in strips, several of which are identified in the drawing by the numeral 16. These strips are preferably affixed directly to the mounting panel in accordance with a predetermined circuit diagram and, in the embodiment illustrated, are equal in number to the number of contact pins extending from the tube. The strips 17 may be disposed upon the mounting panel by the use of any one of a variety of techniques applicable to the printed circuit art.

For example, the strips may be formed by covering the surface of the panel with a suitably configured stencil, and by spraying the panel with conductive material, prior to removal of the stencil. It will be noted that, since alternate slots (see for example the slot shown at 18, in Figure 1) extend outwardly of the aperture sufficiently far to intersect the arcuate margin 19 of the printed area, configuration of the central portion of the stencil is not critical.

Figure 2:
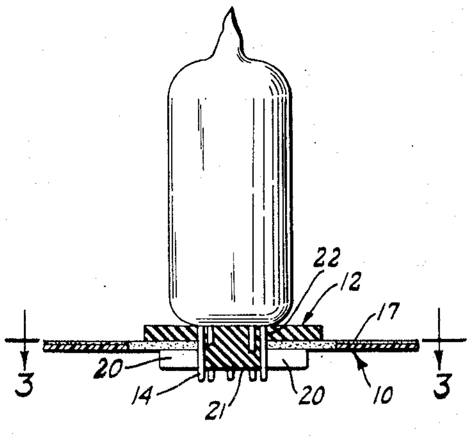
Figure 2 is a sectional-elevational view of apparatus constructed in accordance with our invention.

As is clear from Figures 1 and 2, the spaced, adjacent wall portions of those slots which are aligned with the strips 17 have been sprayed, or otherwise coated with conductive material. Hence, after the tube has been inserted, and the pins thereof occupy the position shown in Figures 2 and 3, each of said pins is electrically connected with a corresponding one of said strips 17.

Since the elastic properties of the material employed for the mounting panel may not be sufficient to insure the proper contact pressure, the above mentioned resilient member 12 is preferably interposed between the tube and the panel, this member serving not only to guide the pins during insertion of the tube, but further being effective to increase the contact pressure between the aforesaid fingers and the tube pins. As shown, the resilient member 12 takes the form of a generally disc-shaped plug of rubber, or like material. Depending from the plug are a plurality of fins 20, each of which is of a width slightly in excess of the width of the slots formed in the mounting panel, and each of which is adapted to be disposed within a corresponding one of those of the slots which are disposed intermediate the adjacent pairs of conductive strips 17. The fins extend radially from a central boss 21 which is of a size to be received within aperture 11, in the manner clearly shown in Figure 3.

The plug is further provided with a plurality of small circular apertures extending therethrough, each said aperture being disposed to receive a corresponding one of the tube pins and lying between the adjacent fins 20. Two of these apertures appear at 22—22 in Figure 1, and as is clear from the drawing, the apertures 22 are so disposed in the plug as to overlie the inner open-ended portions of the slots 13, when the apparatus is assembled.

Figure 3:
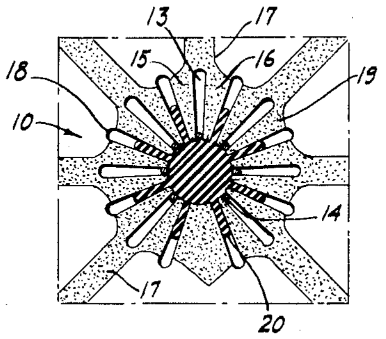
Figure 3 is a sectional view of the apparatus taken in the direction indicated by the line 3—3 applied to Figure 2.

In assembly of the apparatus, the plug 21 is placed upon the surface of the mounting panel in such a position that one of the apertures 22 overlies the inner open end of each of those slots which extend radially toward one of the aforesaid conductive strips 17. When in such position, the fins 20 are disposed for insertion within those slots lying intermediate of the slots last mentioned (Figure 3). When the panel and the plug have thus been brought into registry, the fins 20 are forced within the underlying slots and, as will now be understood, insertion of the pins within the apertures 22 completes the assembly operation.

The resilient member, or plug 12, in addition to maintaining the desired contact pressure between the fingers and the tube pins, provides guide means facilitating the insertion of the tube, by virtue of the ease with which the tube pins may be properly aligned with the apertures 22. Further, the member 12 serves to prevent breakage which might otherwise result from forcible engagement between the base of the tube and the panel structure.

From the foregoing description, it will be evident that the present invention provides novel, simple, and inexpensive apparatus for supporting tubes and for releasibly establishing connection of the same with electrical circuits of the printed circuit type.

We claim:

1. In apparatus for connecting the contact pins of an electrical device with associated electrical circuits, a non-conductive mounting panel, said panel being provided with a plurality of elongated slots, the elongated opposed walls defining said slots being disposed to form surface portions adapted to engage contact pins inserted therebetween, the space between adjacent surface portions being less than the diameter of the pins to be received therebetween and the material of said panel having appreciable inherent resilience, whereby said surface portions may bear resiliently against said pins, conductive material forming a plurality of conductive strips carried by said mounting panel and defining a predetermined circuit arrangement, and conductive means disposed upon the aforesaid pin-engaging surface portions and being in electrically conductive relation with said strips.

2. In apparatus for connecting the contact pins of an electrical device with associated electrical circuits, a non-conductive mounting panel, said panel being provided with a generally circular aperture and having a plurality of elongated slots extending radially outwardly from said aperture, said slots being disposed to form fingers between which contact pins may be inserted, the spacing between adjacent fingers being less than the diameter of the pins to be received therebetween, whereby said fingers may bear resiliently against said pins, and conductive material forming a plurality of conductive strips carried by said mounting panel and defining a predetermined circuit arrangement, the material forming said strips extending inwardly of said slots and overlying surfaces of said fingers in position to make contact with pins inserted between said fingers.

3. Apparatus in accordance with claim 2, and including resilient non-conductive means overlying said slots and being provided with pin-receiving apertures disposed in registry with the surfaces between which said pins may be received, said resilient means further including fin-like portions extending within at least certain of said slots, and acting to increase the contact pressure between said pins and the said surfaces of said fingers.

4. In apparatus for connecting the contact pins of a radio tube with associated electrical circuits, a non-conductive mounting panel, said panel being provided with a generally circular aperture having a plurality of slots extending radially therefrom, said slots being so disposed that the panel portions lying therebetween form fingers extending toward said aperture, said fingers being disposed in pairs arranged about said aperture in progressive adjacency and the fingers forming at least certain of said pairs being spaced sufficiently to permit engagement of contact pins therebetween, and a plurality of conductive strips carried by said panel, each said strip extending toward and being in electrically conductive relation with the pin-engaging portions of a corresponding one of said pairs of fingers.

5. Apparatus in accordance with claim 4, and including resilient non-conductive means overlying said slots and being provided with pin-receiving apertures disposed in registry with said pin-receiving pairs of fingers, said resilient means further including portions extending between adjacent pairs of fingers and effective to increase the contact pressure between said fingers and said pins.

6. Apparatus in accordance with claim 5, and further characterized in that said resilient means includes a boss disposed within said generally circular aperture and serving to retain said resilient means in proper position with respect to said fingers.

INGO L. STEPHAN.
DUNDRED D. EVERS.

REFERENCES CITED

The following references are of record in the file of this patent:

UNITED STATES PATENTS

| Number | Name | Date |
|---|---|---|
| 1,871,292 | Alden | Aug. 9, 1932 |

FOREIGN PATENTS

| Number | Country | Date |
|---|---|---|
| 686,445 | France | Apr. 14, 1930 |